(12) United States Patent
Andler et al.

(10) Patent No.: US 7,387,443 B2
(45) Date of Patent: Jun. 17, 2008

(54) PISTON PIN BUSHING

(75) Inventors: Gerd Andler, Bad Schwalbach (DE); Maik Wilhelm, Trebur (DE); Andreas Dengler, Bad Schwalbach (DE); Gerhard Weil, Hünfelden (DE)

(73) Assignee: Federal Mogul Wiesbaden GmbH, Wiesbaden (DE)

( * ) Notice: Subject to any disclaimer, the term of this patent is extended or adjusted under 35 U.S.C. 154(b) by 101 days.

(21) Appl. No.: 10/526,734

(22) PCT Filed: Sep. 3, 2003

(86) PCT No.: PCT/DE03/02928
§ 371 (c)(1),
(2), (4) Date: Mar. 4, 2005

(87) PCT Pub. No.: WO2004/025145
PCT Pub. Date: Mar. 25, 2004

(65) Prior Publication Data
US 2006/0005702 A1    Jan. 12, 2006

(30) Foreign Application Priority Data
Sep. 6, 2002    (DE)    ................. 102 41 465

(51) Int. Cl.
*F16C 33/02*    (2006.01)
(52) U.S. Cl. ........................................ 384/276
(58) Field of Classification Search ................ 384/276, 384/279, 912, 282, 288, 294
See application file for complete search history.

(56) References Cited

U.S. PATENT DOCUMENTS 5,620,262 A    4/1997    Kumada et al.

(Continued)

FOREIGN PATENT DOCUMENTS

DE    3036062 A1    4/1982

(Continued)

OTHER PUBLICATIONS

Geometrical Product Specifications (GPS) - Surface texture; Profile method; Surfaces having stratified functional properties, International Standard, First Edition Dec. 1, 1996.

(Continued)

*Primary Examiner*—Thomas R. Hannon
(74) *Attorney, Agent, or Firm*—Robert L. Stearns; Dickinson Wright PLLC

(57) ABSTRACT

The invention relates to gudgeon pin bushes which find application in highly-stressed engines, with the problem of a tendency to pit, in particular in the middle regions (with relation to the radial axis of the bush), on starting the motor. According to the invention, the problem can be avoided whereby the friction surfaces of a gudgeon pin bush, at least in the high loading region, have the following parameters measured over the bush cross-section in the axial direction: the support percentage is a minimum of 99.0% to a depth of at most 1.800 m, the depth of the roughness core profile is at most 0.30 m, the proportion of the material Mr1 of the roughness core profile is at most 8%. The gudgeon pin bush can be obtained by finishing the bearing surface of the gudgeon pin bush using a surface machining method.

8 Claims, 4 Drawing Sheets

Figure 1A:
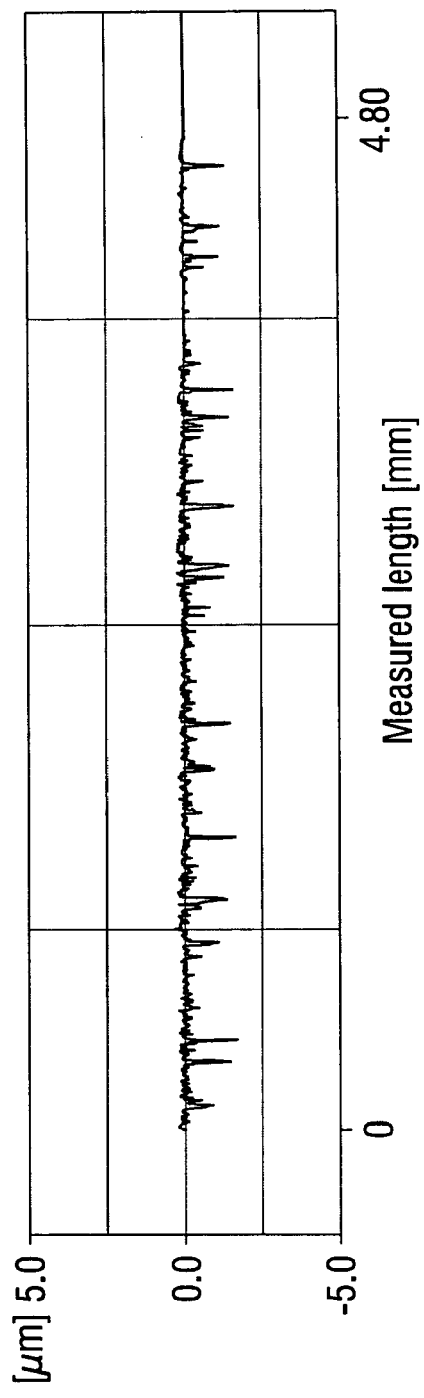

U.S. PATENT DOCUMENTS 6,273,972 B1    8/2001    Andler
6,540,403 B1 *    4/2003    Damour ..................... 384/276
6,560,869 B1    5/2003    Schlegel et al.

FOREIGN PATENT DOCUMENTS

| | | |
|---|---|---|
| DE | 3728 847 A | 3/1988 |
| DE | 4133586 | 12/1992 |
| DE | 197 31 625 A1 | 9/1998 |
| DE | 198 61 160 C1 | 12/2001 |
| DE | 10029950 | 1/2002 |

OTHER PUBLICATIONS

Federal Mogul Glyco, Chart Jul. 18, 2002.
The German Nationa Library - CIP, Manufacturing Methods and Wilfried KOnig. - Kiinig, Wilfried; Klocke, Fritz; vol. 2 Grinding and Honing, rags, - 3rd., Germany Feb. 1997.
Use of Copper and Copper Alloys, German Copper Institute, Germany, no date.
Professor Wolfgang Beitz, Professor Karl-Heinz Kiittner, Technical University of Berlin 1990.

* cited by examiner

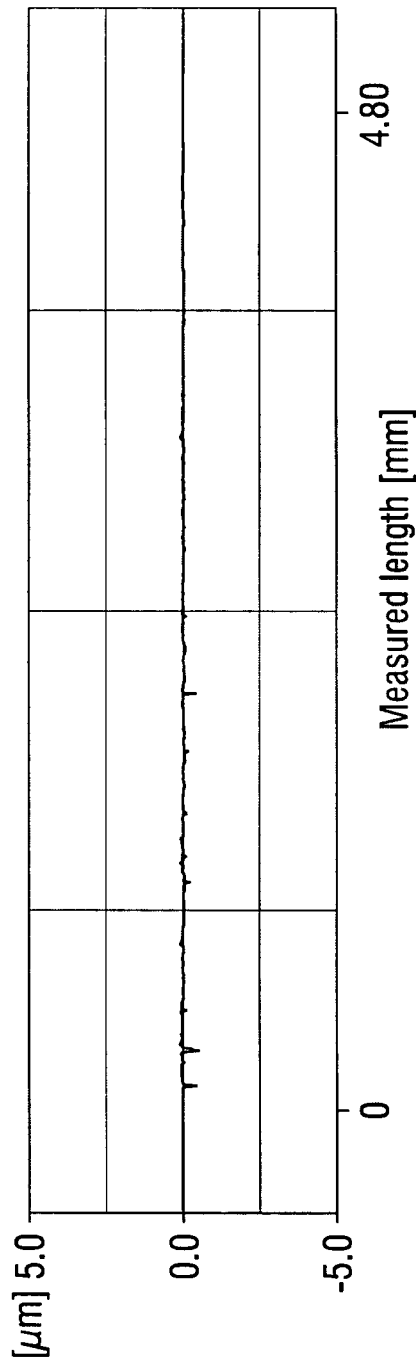
Fig. 2a
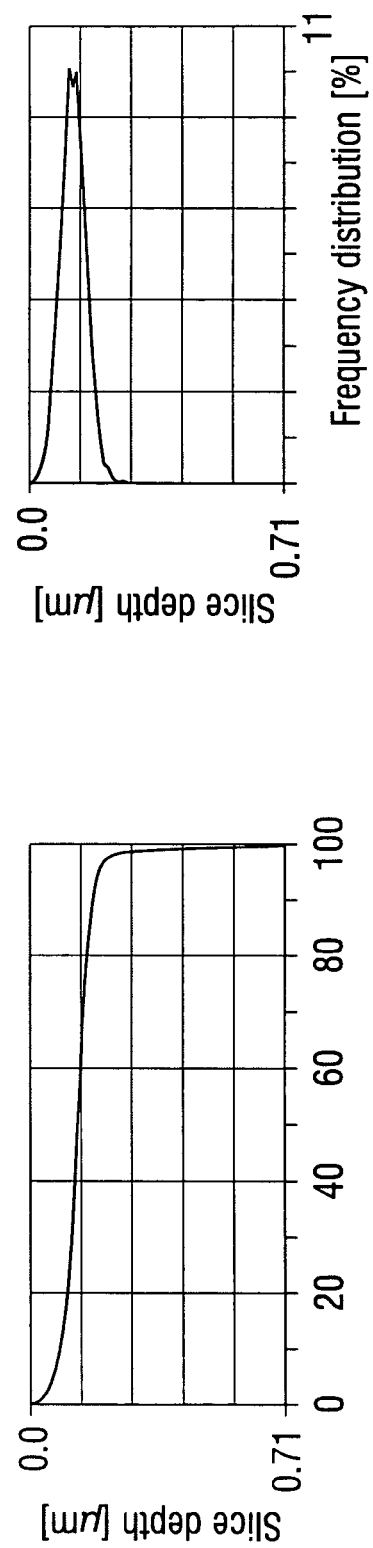
Fig. 2b
Fig. 2c

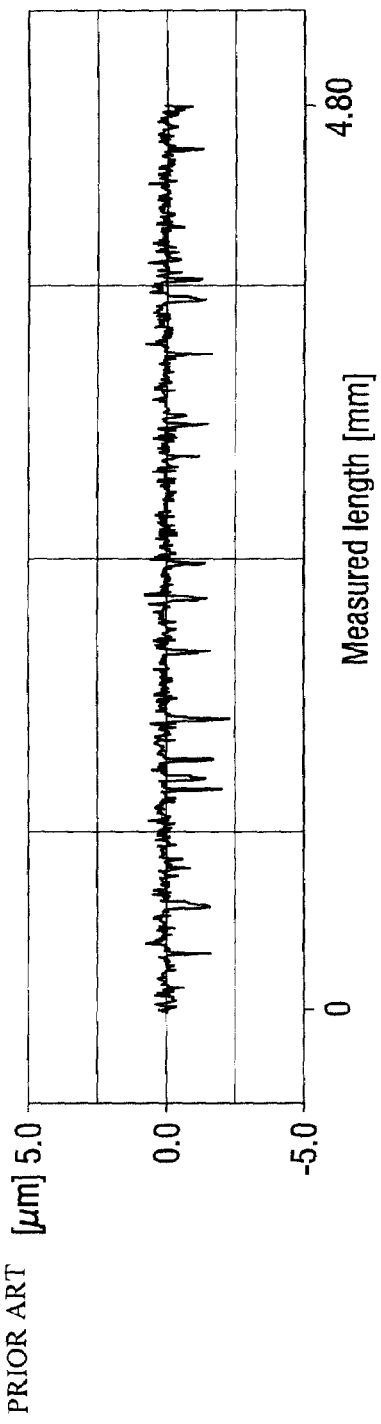
Fig. 3a PRIOR ART
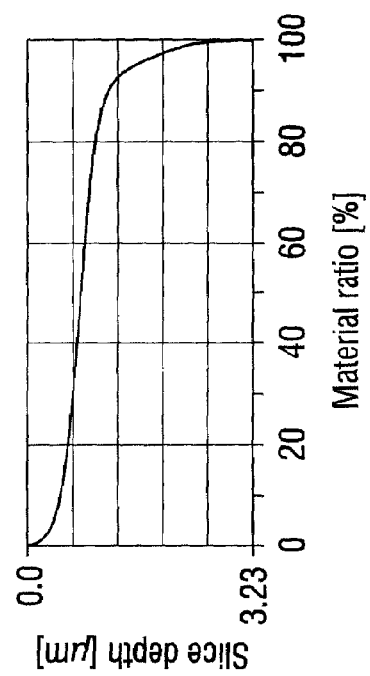
Fig. 3b PRIOR ART
Fig. 3c PRIOR ART

PISTON PIN BUSHING

BACKGROUND OF THE INVENTION

1. Technical Field

The invention relates to a piston pin bushing. In addition, the invention relates to a method of producing such a piston pin bushing.

2. Related Art

Piston pin bushings are bushings which are provided in the small end eye in connecting rods for internal combustion engines. In the event of heavy engine load, a problem has arisen in the form of a tendency on the part of the bushing, in particular in the middle area (relative to the radial axis of the bushing), to suffer seizure during running in of the engine.

Piston bushings may be solid and made from one material or they may comprise a backing layer and an overlay. Where an overlay is mentioned below, it is also used to mean the part of the material of a solid piston pin bushing located at the inner surface.

In the past, more attention was paid to the problem of the introduction of forces and distribution of stresses in the area of the piston/connecting rod connection.

The attempt is made in DE 30 36 062 C2 to avoid stress peaks in the upper area of the piston pin bosses by rounding the edge of the piston pin bore or widening the piston pin bore.

According to DE 41 33 586 A1, local overloading of the piston pin bushing is prevented by making resilient the end areas of the connecting rod bore, i.e. the small end eye, adjoining the end faces. To this end, either relief grooves are incorporated or the wall thickness is minimized.

In DE 198 28 847 A1, the piston pin bushing is provided with an adequate service life at relatively high operating forces in that material reductions, in particular perforations, are provided in the transition region between the apex lines of the bushing. In this way, the radial pressure is shifted to the area of the bushing ends.

According to DE 100 29 950 A1, the pressure peaks at the outer edge of the connecting rod eye, which are caused by bending of the pin under load, are absorbed in that the connecting rod eye takes the form of a shaped bore which differs from cylindrical in shape in such a way that it follows the deformation of the piston pin. The use of a bushing is thereby intended to become superfluous. Relief grooves, which are complex to produce and are therefore expensive and, moreover, lead to loss of oil, are also superfluous.

However, there are disadvantages in dispensing with a bushing: on the one hand, it is only possible to achieve optimum friction pairing between connecting rod and piston pin by using a bushing. On the other hand, the bushings also contribute to achieving alignment with the big end eye as a result of post-machining of the bushings after installation.

EP 0 716 240 B1 relates to increasing the seizure resistance of a plain bearing. This is achieved therein by a defined surface structure which extends from the bearing alloy layer through the intermediate layer and into the overlay layer. This peak and valley structure with specified conditions relating to peak height, intermediate layer thickness and overlay layer thickness has the effect that, even after a degree of abrasion, the sliding surface still includes parts of the overlay and intermediate layers, which are thus available as lubricant.

However, plain bearings differ fundamentally from bushings with regard to type of stress and lubrication conditions. Plain bearings are pressure oil lubricated and a hydrodynamic lubricating film generally forms due to the large relative speeds between shaft and bearing. In contrast, in the connecting rod small end eye generally only small, oscillating relative movements arise between piston pin and piston bin bushing, i.e. mixed friction conditions arise far more frequently, resulting in solid-solid contact. The findings disclosed in EP 0 716 240 B1 cannot therefore be directly transferred to bushings, in particular piston pin bushings.

SUMMARY OF THE INVENTION

In the light of the above, the object is to provide a piston pin bushing which does not have a tendency to seize during running-in of the engine even under heavy engine load, and also a suitable manufacturing method.

This object is achieved by a piston pin bushing, the overlay surface of which exhibits the following parameter values at least in the main load area, measured over the bushing cross-section in the axial direction:

- at a depth of at most 1.800 µm, the bearing ratio amounts to a minimum of 99.0%;
- the depth of the roughness core profile amounts to a maximum of 0.30 µm;
- the material ratio Mr1 of the roughness core profile amounts to a maximum of 8%.

The object is additionally achieved in that the overlay of the piston pin bushing is finished using a surface treatment method.

During the course of development of the piston pin bushing according to the invention, it surprisingly emerged that the problem cannot be dealt with solely by optimizing the bearing material with regard to composition, make-up and grain structure, a specially designed surface topography being required to achieve the objective. If piston pin bushings are made available with the surface structure defined according to the invention, seizure during the running-in phase may be effectively prevented.

The bearing ratio at a given slice depth may be established in that, for example in the context of measurement of a roughness profile, layers in the tenth of a µm range are successively sampled and it is established, after each sampling step, how high the ratio of solid material is to the total surface area. A bearing ratio of 100% is obtained beneath the deepest valley of the roughness profile. It has emerged that seizure during the running-in phase is prevented if the bearing ratio is as high as possible even at a small slice depth.

A further parameter for determining the quality of the sliding surface topology of the piston pin bushing is the depth of the roughness core profile, the so-called Rk value. If the slice depth is plotted against the bearing ratio, a curve profile is generally obtained which exhibits a broad, flat portion between a steep drop with small bearing ratios and a steep drop with high bearing ratios. Precise determination of the Rk value is described in EN ISO 13565-2. Very good results with regard to seizure-free running-in are achieved with the piston pin bushings according to the invention, if the Rk value of the overlay amounts to a maximum of 0.30 .mu.m in the main load area.

Determination of the material ratio Mr1 of the roughness core profile, which is stated in percent and is determined by the intersection line which separates the protruding peaks from the roughness core profile, is also defined in EN ISO 13565-2. Mr1 should amount to 8% at most. Preferably Mr1 should amount to a maximum of 7%.

Piston pin bushings are particularly preferred whose overlay surface in the main load area exhibits a bearing ratio of at least 99.0% at a slice depth of at most 0.900 µm. It has proven advantageous for the Rk value of the overlay to amount to a maximum of 0.15 µm in the main load area.

The piston pin bushings according to the invention may additionally be characterized by the half width of the frequency distribution of the roughness profile. To this end, the frequency of peaks and valleys of the overlay surface is plotted as a function of the difference in height thereof. Preferably, the distribution width at half the maximum amounts to at most 0.20 μm, particularly preferably at most 0.10 μm.

According to the invention, the surface characteristics of the piston pin bushings described above are produced in that said bushings are finished by surface treatment methods such as for example honing, reaming, grinding, lapping, sizing, polishing, broaching, precision turning or erosion, to yield the required surface profile. Plateau honing, in which the surface may be made particularly level in a plurality of stages, has proven particularly advantageous.

In a preferred embodiment, the piston pin bushing according to the invention comprises an overlay, which consists at least to the greatest possible extent of a lead-free copper alloy. The systems CuAl (aluminum bronze), CuZn (brass) or CuSnZn (red brass) are particularly preferred.

The particular advantages of the overlay surface of the piston pin bushing according to the invention with regard to its resistance to running-in seizure may be achieved both with grain structures of heterogeneous make-up and with those of homogeneous make-up. This is particularly important if the alloy element lead has to be avoided in the bearing materials for environmental or manufacturing reasons. The special surface structure may at least compensate for the absence of the special tribological properties of lead, i.e. even without lead as an alloy element no running-in seizure occurs in use.

THE DRAWINGS

Figure 1C:
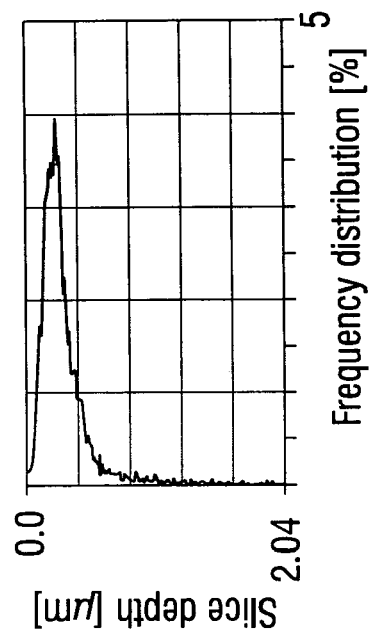
Figure 1B:
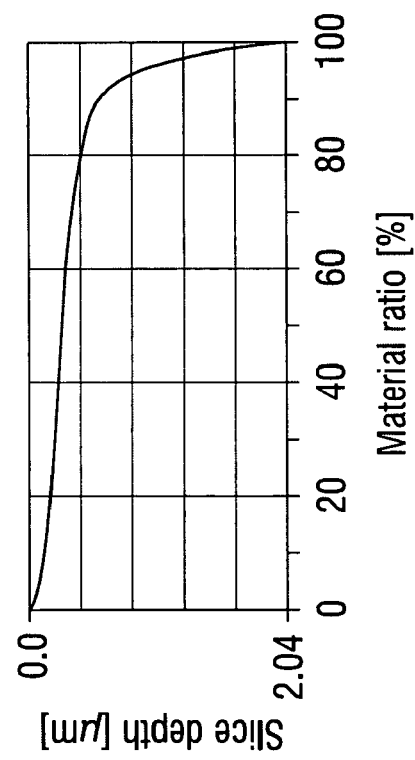
Figure 4B:
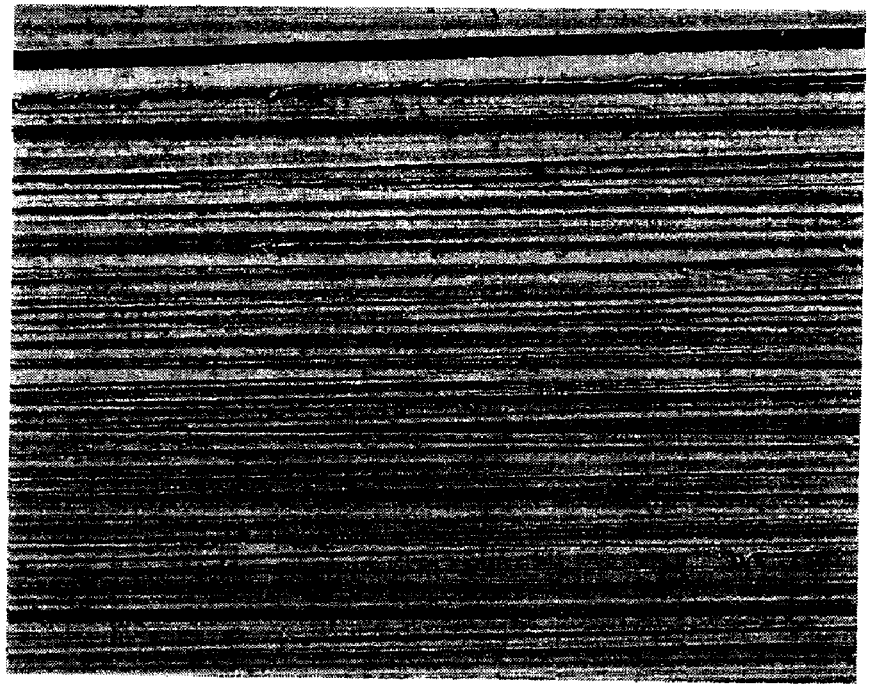
Figure 4A:
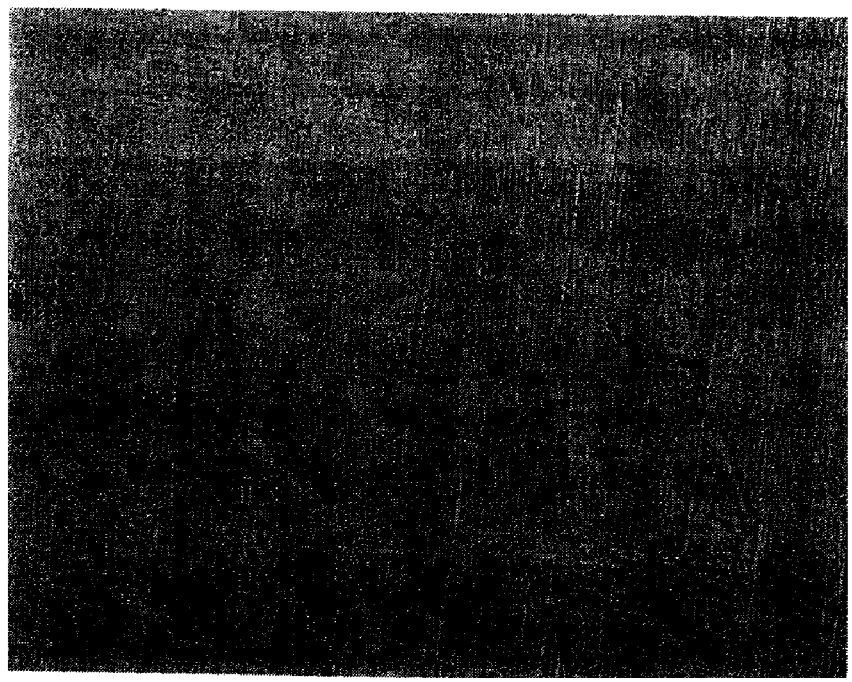

The invention will be explained in more detail with reference to the following diagrams and illustrations, in which:

FIG. 1a shows the roughness profile of a first piston pin bushing,

FIG. 1b shows the material ratio at different slice depths of a first piston pin bushing, FIG. 1c shows the frequency distribution of the roughnesses of a first piston pin bushing, FIG. 2a shows the roughness profile of a second piston pin bushing, FIG. 2b shows the material ratio at different slice depths of a second piston pin bushing, FIG. 2c shows the frequency distribution of the roughnesses of a second piston pin bushing, FIG. 3a shows the roughness profile of a conventional piston pin bushing, FIG. 3b shows the material ratio at different slice depths of a conventional piston pin bushing, FIG. 3c shows the frequency distribution of the roughnesses of a conventional piston pin bushing, FIG. 4a shows a scanning electron micrograph of the overlay surface of a piston pin bushing according to the invention and FIG. 4b shows a scanning electron micrograph of the overlay surface of a conventional piston pin bushing.

DETAILED DESCRIPTION

FIG. 1a shows the roughness profile of a first piston pin bushing. The sliding surface of this first piston pin bushing was subjected to mechanical surface smoothing. The total sample length amounted to 4.80 mm, the total height of the profile $R_t$ (EN ISO 4287) is approximately 2 μm. The surface of the overlay was measured successively in 0.150 μm slice depth steps. At each slice depth, the bearing ratio was determined. In addition, the values Rk and Mr1 were determined. The results are summarized in Table 1.

As is clear from Table 1, this first piston pin bushing exhibits a bearing ratio of 99.5% at a slice depth of 1.800 μm. In addition, its overlay surface has an Rk value of 0.26 μm and an Mr1 value of 5.9%.

In FIG. 1b, the slice depth is plotted against the bearing ratio. This distribution results, according to EN ISO 13565-2 in an Rk value of 0.26 μm.

The frequency of the individual unevennesses is plotted in FIG. 1c. This distribution exhibits a half width of 0.18 μm.

The second piston pin bushing according to the invention described by FIGS. 2a-c and Table 2 was finished by plateau honing. At a slice depth of only 0.45 μm, it already exhibits a bearing ratio of 99.7%. A bearing ratio of 100% is achieved at a slice depth of as little as 0.75 μm. The Rk value of 0.11 μm is much smaller than with the first piston pin bushing. The Mr1 value of 6.9%, on the other hand, is higher. The half width of the frequency distribution amounts of 0.08 μm and is thus much smaller than for the first piston bushing. It has been demonstrated that this second piston bushing is optimally suitable for use even under extremely heavy loads.

In comparison, FIGS. 3a, b and c and Table 3 show the measured values for a conventional piston pin bushing. At a slice depth of 0.450 μm, the bearing ratio amounts to only 4.7%, at a slice depth of 0.900 μm to 68.7%, at a slice depth of 1.200 μm to 90.0% and at a slice depth of 1.800 μm to 96.2%. Only at a slice depth of 2.400 μm is the 99% threshold exceeded for the bearing ratio. At 0.52 μm, the Rk value is twice that of the first piston pin bushing according to the invention. At 9.9%, the Mr1 value is much higher than in the case of the two piston pin bushings according to the invention. And, at 0.66 μm, the half width of the roughness frequency distribution is more than 3 times that of the first piston pin bushing according to the invention.

FIGS. 4a and 4b show scanning electron micrographs of a piston pin bushing according to the invention (FIG. 4a) and a conventional piston pin bushing (FIG. 4b). The surface of the overlay of the piston pin bushing according to the invention was finished by plateau honing, resulting in a surface of very slight roughness with a high bearing ratio even at a small slice depth. The surface of the overlay of the conventional piston pin bushing, on the other hand, was machined using rough honing. This results in a pronounced striped pattern, which exhibits very considerable roughness. This results, in particular when the piston pin bushing is used under heavy engine load, in seizure during running in.

TABLE 1

| Rk = 0.26 μm, Mr1 = 5.9% | |
|---|---|
| Slice depth | Bearing ratio |
| 0.150 μm | 14.6% |
| 0.300 μm | 64.6% |
| 0.450 μm | 85.3% |
| 0.600 μm | 91.4% |
| 0.750 μm | 93.7% |
| 0.900 μm | 95.2% |
| 1.050 μm | 96.2% |
| 1.200 μm | 97.0% |
| 1.350 μm | 97.8% |
| 1.500 μm | 98.5% |
| 1.650 μm | 99.1% |
| 1.800 μm | 99.5% |
| 1.950 μm | 99.8% |
| 2.100 μm | 100.0% |
| 2.250 μm | 100.0% |

TABLE 1-continued

Rk = 0.26 μm, Mr1 = 5.9%

| Slice depth | Bearing ratio |
|---|---|
| 2.400 μm | 100.0% |
| 2.550 μm | 100.0% |
| 2.700 μm | 100.0% |
| 2.850 μm | 100.0% |
| 3.000 μm | 100.0% |

TABLE 2

Rk = 0.11 μm, Mr1 = 6.9%

| Slice depth | Bearing ratio |
|---|---|
| 0.150 μm | 73.4% |
| 0.300 μm | 99.2% |
| 0.450 μm | 99.7% |
| 0.600 μm | 99.9% |
| 0.750 μm | 100.0% |
| 0.900 μm | 100.0% |
| 1.050 μm | 100.0% |
| 1.200 μm | 100.0% |
| 1.350 μm | 100.0% |
| 1.500 μm | 100.0% |
| 1.650 μm | 100.0% |
| 1.800 μm | 100.0% |
| 1.950 μm | 100.0% |
| 2.100 μm | 100.0% |
| 2.250 μm | 100.0% |
| 2.400 μm | 100.0% |
| 2.550 μm | 100.0% |
| 2.700 μm | 100.0% |
| 2.850 μm | 100.0% |
| 3.000 μm | 100.0% |

TABLE 3

Rk = 0.52 μm, Mr1 = 9.9%

| Slice depth | Bearing ratio |
|---|---|
| 0.150 μm | 0.4% |
| 0.300 μm | 1.1% |
| 0.450 μm | 4.7% |
| 0.600 μm | 17.8% |
| 0.750 μm | 43.5% |
| 0.900 μm | 68.7% |
| 1.050 μm | 83.6% |
| 1.200 μm | 90.9% |
| 1.350 μm | 93.2% |

TABLE 3-continued

Rk = 0.52 μm, Mr1 = 9.9%

| Slice depth | Bearing ratio |
|---|---|
| 1.500 μm | 94.3% |
| 1.650 μm | 95.3% |
| 1.800 μm | 96.2% |
| 1.950 μm | 96.8% |
| 2.100 μm | 97.7% |
| 2.250 μm | 98.4% |
| 2.400 μm | 99.1% |
| 2.550 μm | 99.5% |
| 2.700 μm | 99.7% |
| 2.850 μm | 99.8% |
| 3.000 μm | 99.9% |

The invention claimed is:

1. A piston pin bushing having an overlay surface exhibiting parameter values at least in a main load area of the bushing measured over a cross-section in an axial direction of the bushing of:
   at a depth of at most 1.800 μm, a bearing ratio amounting to a minimum of 99.0%;
   a depth of roughness core profile amounting to a maximum of 0.30 μm; and
   a material ratio Mr1 of the roughness core profile amounting to a maximum of 8%.

2. A piston pin bushing according to claim 1, wherein the material ratio Mr1 of the roughness core profile amounts to a maximum of 7%.

3. A piston pin bushing according to claim 1 wherein the bearing ratio amounts to a minimum of 99.0% at a depth of at most 0.900 μm.

4. A piston pin bushing according to claim 3, wherein the depth of the roughness core profile amounts to a maximum of 0.15 μm.

5. A piston pin bushing according to claim 1, wherein the overlay consists of a lead-free copper-based alloy.

6. A piston pin bushing according to claim 5, wherein the overlay is selected from the group consisting of a copper-aluminum, a copper-zinc or a copper-tin-zinc alloy.

7. A piston pin bushing according to claim 1, wherein a frequency distribution of the roughness profile of the overlay topography exhibits a half width of at most 0.20 μm.

8. A piston pin bushing according to claim 1, wherein a frequency distribution of the roughness profile of the overlay topography exhibits a half width of at most 0.10 μm.

* * * * *